United States Patent [19]
Hall

[11] 3,762,759
[45] Oct. 2, 1973

[54] TELESCOPING TOP SECTION CAMPER

[76] Inventor: Joshua D. Hall, Miesau Army Depot Aezmmi-su APO, New York, N.Y. 09059

[22] Filed: Feb. 7, 1972

[21] Appl. No.: 224,160

[52] U.S. Cl. ................. 296/23 MC, 296/27, 52/66
[51] Int. Cl. ............................................. B60p 3/32
[58] Field of Search ..................... 296/23 C, 23 MC, 296/27, 23 R, 26; 52/66, 67

[56] References Cited
UNITED STATES PATENTS

| | | | |
|---|---|---|---|
| 3,437,372 | 4/1969 | McGarry | 296/27 |
| 3,659,893 | 5/1972 | Steele | 296/23 R |
| 3,635,515 | 1/1972 | White | 296/23 MC |
| 3,582,129 | 6/1971 | Frank | 296/23 R |
| 3,494,655 | 2/1970 | Linton | 296/23 C |

Primary Examiner—Philip Goodman
Assistant Examiner—John A. Carroll
Attorney—Robert K. Rhea

[57] ABSTRACT

A camper body is provided with a rearward depending storage compartment which is fitted within the trunk area of a passenger vehicle. The portion of the camper body above the storage compartment projects laterally of the vehicle trunk area and forwardly over the roof surface of the vehicle. The camper body includes a top section which telescopically overlies the upper limit of a lower section and is raised and lowered by pressure cylinders supported by the lower section.

1 Claim, 5 Drawing Figures

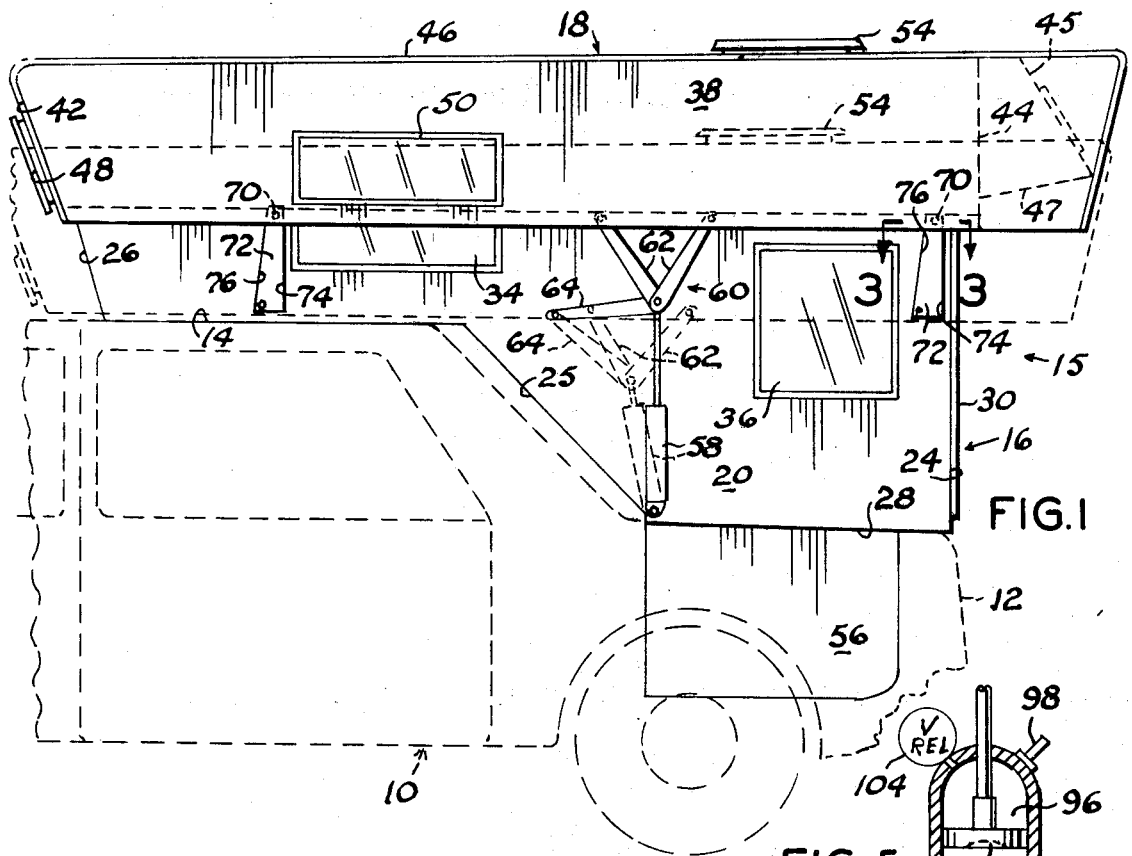

TELESCOPING TOP SECTION CAMPER

BACKGROUND OF THE INVENTION

1. Field of the invention

The present invention relates to campers supported by vehicles and more particularly to a camper for a passenger vehicle having a rearward trunk compartment and means for vertical movement of the top section of the camper from an extended occupied position to a collapsed telescoped travelling position.

2. Description of the prior art

Most camper bodies, as shown by prior patents, are structurally formed to be cooperatively received by the bed of a pick-up truck, or the like. Some of the prior patents also disclose collapsible features for the camper from an extended position while in use to a collapsed travel position employing hydraulic cylinders or chain and sprocket arrangements. U.S. Pat. Nos. 3,360,294 and 3,397,909 are examples of collapsible structure campers as used with pick-up trucks.

This invention is distinctive over these patents and other similar campers in that it provides a camper structure having a top section telescopically received by a lower section with the rear portion of the structure arranged to be received and supported by the rearward trunk area of a passenger vehicle and which extends forwardly in overlying relation with respect to the top surface of the roof of the passenger vehicle. Pressure operated means is connected with the camper top section for vertical telescoping movement of the top section between a fully extended occupied position and a collapsed travel position.

SUMMARY OF THE INVENTION

The lower portion of the camper body transversely overlies the trunk area of a vehicle body with a portion of the lower section extending forwardly and overlying the roof area of the vehicle body. This lower section of the camper body is provided with a camper door and window and lateral window areas in its respective side walls. A central substantially rectangular storage compartment depends from the rearward end portion of the lower section and is cooperatively received by the trunk area of the vehicle. A substantially rectangular inverted box-like structure forms the top section of the camper which telescopically overlaps the upper wall area of the lower section. A pair of hydraulic cylinders, connected with opposing walls of the lower section, have their pistons connected by bracket means with the top section for vertical telescoping movement of the latter. The hydraulic cylinders are connected with a master cylinder in lieu of a hydraulic pump with the piston of the master cylinder operated by an air pressure supply from containers stored in the depending storage area of the camper. Rollers, connected with the top section walls, are cooperatively received in guide slots formed in the lower section walls for guiding the top section during its telescoping movement.

The principal object of this invention is to provide a collapsible type camper structure which may be supported by a passenger type vehicle and operated from a fully extended to a collapsed position by a pressure means contained by the camper structure.

BRIEF DESCRIPTION OF THE DRAWINGS

FIG. 1 is a side elevational view of the camper mounted on a fragment of a passenger vehicle shown by dotted lines and illustrating the vertical telescoping movement of the top section by dotted lines;

FIG. 2 is a rear end elevational view of the camper, per se;

FIG. 3 is a fragmentary horizontal cross-sectional view, to a larger scale, taken substantially along the line 3—3 of FIG. 1;

FIG. 4 is a diagram of the pressure cylinders and operating components; and,

FIG. 5 is a vertical cross-sectional view, to a different scale, of the master cylinder inverted from the position shown by FIG. 4.

DESCRIPTION OF THE PREFERRED EMBODIMENT

Like characters of reference designate like parts in those figures of the drawings in which they occur.

In the drawings:

The reference numeral 10 indicates the rearward end portion of a substantially conventional passenger vehicle having a rear deck compartment commonly referred to as a trunk area 12 and a top surface 14.

The numeral 15 indicates the camper, as a whole, comprising a bottom or lower section 16 and a top section 18. The bottom section 16 is formed by opposing side walls 20 and 22 spaced-apart a distance substantially equal to the width of the vehicle 10 and joined to a vertical back wall 24. A transverse forwardly and upwardly inclined wall 25, joining the side walls, is spaced rearwardly of the plane of the rear window of the vehicle and extends horizontally forward over the vehicle top 14 and is joined to a forward or front wall 26 forwardly and upwardly inclined at the forward limit of the forwardly projecting portions of the side walls 20 and 22. A bottom wall 28, joined to the side walls 22, rear wall 24 and depending edge of the inclined wall 25, overlies the trunk compartment 12 and projects laterally thereof. The rearward wall 24 is provided with an access door 30 and at least one rearward window 32. Similarly windows 34 and 36 are formed in the respective side walls 20 and 22, only two being shown. The lower section 16 forms an upwardly open compartment.

The top section 18 is substantially rectangular box-like in general configuration having side walls 38 and 40 joined to a front end wall 42, a rearward end wall 44 and spanned by a top wall 46. The front wall 42 is angularly inclined rearwardly in cooperation with the plane of the lower section front wall 26 and similarly the vertical rearward wall 44 cooperates with the lower section rear wall 24. Top section rear end inclined walls 45 and 47 form a storage compartment. The front wall 42 is provided with a window 48 and the side walls of the top section 18 are provided with window areas 50, only one being shown, cooperatively aligned with the lower section side wall windows 34. Similarly an access door 52 is formed in the inclined rearward wall 45. A window-like top opening 54 is formed in the upper section top surface 46.

A box-like rectangular storage compartment 56 is connected in depending relation to the lower section bottom wall 28 and dimensioned to be received by the trunk compartment of the vehicle with access to the storage area 56 achieved by hinged panels, or the like, not shown, forming a part of the floor 28. The purpose of the compartment 56 is to store pressure cylinder operating components.

A pair of hydraulic cylinders 58 are respectively connected to the opposing side walls 20 and 22 with the pistons of these cylinders pivotally connected to a bracket means 60. The bracket means 60 comprises a pair of arms 62 connected in Y fashion to a depending edge portion of the respective top section side walls 38 and 40. A link 64, similarly connected at one end with the piston, is connected at its other end to the respective lower section side wall 20 and 22 forwardly of the vertical axis of the cylinder so that, when the piston is extended and retracted, the link 64 forms a limit for movement of the tilting action of the respective cylinder in raising and lowering the top section with respect to the lower section.

Guide means 66 (FIG. 3) further controls the movement of the walls of the top section during vertical telescoping movement and permits slight forward and rearward movement of the top section with respect to the lower section. The guide means 66 comprises a bolt 68 extending transversely through the forward and rearward end portions of the depending portion of the top section side walls at selected locations and having a roller 70 coaxially secured to its inwardly directed end. The respective roller 70 is freely received within a cooperating recess 72 formed in the outer surface of the respective lower section side walls 20 and 22. The recess 72 has a vertical height equal to the predetermined distance of vertical movement of the top section with respect to the lower section. Each recess 72 is defined by a rearward vertical wall 74 and a forward wall 76 inclined rearwardly and upwardly so that the width of the respective recess 72, as viewed in FIG. 1, converges upwardly. Thus, when the top section 18 is lowered and the bracket means 60 pivots about the fixed connection of the arm 64, as shown by dotted lines, the guide rollers 70 contact the forwardly inclined guide slot walls 76 and guides the top section downwardly. Similarly when the top section is raised, to the solid line position of FIG. 1, the rollers 70 contact the vertical walls 74 of the recesses 72 to compensate for the rearwardly directed force exerted on the top section by the brackets 60 pivoting rearwardly and upwardly.

The pressure end of the cylinders 58 are connected together by tubing 78 in turn connected by tubing 80 through a relief valve 82 to the output port of a hydraulic fluid containing master cylinder 84. A return line is similarly connected to the return end of the cylinders in turn connected by a line 88 to the hydraulic fluid end of the master cylinder through a check valve 90. The master cylinder 84 contains a piston 92 forming a hydraulic fluid chamber 94 and an air chamber 96. An inlet port in the master cylinder, communicating with the air chamber 96, is connected by tubing 98 through a control valve 100 to one or more compressed air cylinders 102. The master cylinder air chamber 96 is also provided with another port communicating with a safety valve 104. The compressed air tanks 102 and master cylinder 84 are preferably disposed within the storage compartment 56 for access thereto and refilling the chambers 102. When it is desired to lift the top section 18, the control valve 100 is opened which moves the master cylinder piston 92 toward its pressure outlet end thus applying pressure, equally, to the cylinders 58 to extend their pistons, as described hereinabove.

Obviously a latch or lock means, not shown, may be employed to secure the top section in elevated position so that the pistons of the cylinders 58 may be relieved of the mass. When it is desired to lower the top section, air is bled off the master cylinder air compartment 96 through the relief valve 104 wherein the mass of the top section forces the pistons of the pressure cylinders 58 downwardly, as viewed in the drawings, thus returning the hydraulic fluid to the master cylinder compartment 94 through the check valve 90.

Access to the camper door 30 is gained by steps, or the like, not shown.

Obviously the invention is susceptible to changes or alterations without defeating its practicability, therefore, I do not wish to be confined to the preferred embodiment shown in the drawings and described herein.

I claim:

1. A collapsible camper structure for a passenger vehicle having a top surface and having a rearward trunk area, comprising:

an upwardly open lower section including upstanding side and end walls supported by said trunk area and having a forward portion overlying said vehicle top surface;

an upper section having depending side and end walls vertically movable over and respectively overlapping said lower section walls to form a roof for said lower section, each said lower section side wall having at least one outwardly open vertically elongated recess in its outer surface;

guide means including a roller disposed within each lower section side wall recess and secured to a depending portion of the respective said top section side wall for guiding said upper section toward and away from said lower section;

hydraulic means including a pair of piston and cylinder combinations connected, respectively, with the side walls of said lower section for raising and lowering said upper section;

a pair of bracket means connecting the respective piston of each cylinder with the depending portion of the top section respective side walls;

a depending box-like storage compartment secured to said lower section, said box-like storage compartment being nested by the vehicle trunk area; and, means for insuring uniform vertical movement of said top section including a fluid pressure operated master cylinder, at least one air cylinder, containing a supply of air under greater than atmospheric pressure within said box-like storage compartment, and, valve and tubing means operatively connecting said air cylinder with said master cylinder.

* * * * *